United States Patent [19]

Kobayashi et al.

[11] Patent Number: 5,035,633

[45] Date of Patent: Jul. 30, 1991

[54] DATA-PROCESSING APPARATUS IN WHICH A CARD-SHAPED RECORDING MEDIUM IS USED

[75] Inventors: Hiromichi Kobayashi, Yokohama; Fumio Izawa, Sagamihara, both of Japan

[73] Assignee: Kabushiki Kaisha Toshiba, Kawasaki, Japan

[21] Appl. No.: 483,941

[22] Filed: Feb. 23, 1990

[30] Foreign Application Priority Data

Feb. 23, 1989 [JP] Japan .................................. 1-43499

[51] Int. Cl.⁵ ........................................... H01R 13/44
[52] U.S. Cl. ..................................... 439/140; 439/131
[58] Field of Search ...................... 439/131, 136–140, 439/297, 298, 310

[56] References Cited

U.S. PATENT DOCUMENTS 4,775,327 10/1988 Normann et al. .................... 439/140
4,940,414 7/1990 Lee ........................................ 439/131

Primary Examiner—Paula A. Bradley

Attorney, Agent, or Firm—Cushman, Darby & Cushman

[57] ABSTRACT

Disclosed is a data-processing apparatus comprising a data-processing unit, a connector unit, a pin-protecting member, and lock members. The lock members hold the pin-protecting member in a first position where the pin-protecting member opposes the pins and prevents anything other than the card-shaped recording medium from abutting on the pins and protects the pins from dust. When a card-shaped recording medium is inserted into the apparatus, the lock members release the pin-protecting member from the first position, whereby the pin-protecting member is moved to a second position. In the second position, the pin-protecting member allows an electrical connection between the pins and the connector of the recording medium. When the recording medium is pulled from the apparatus, the pin-protecting member is moved from the second position back to the first position. In the first position, the pin-protecting member prevents anything other than the recording medium from abutting on the pins, thus protecting the pins from damage and also from dust.

9 Claims, 11 Drawing Sheets

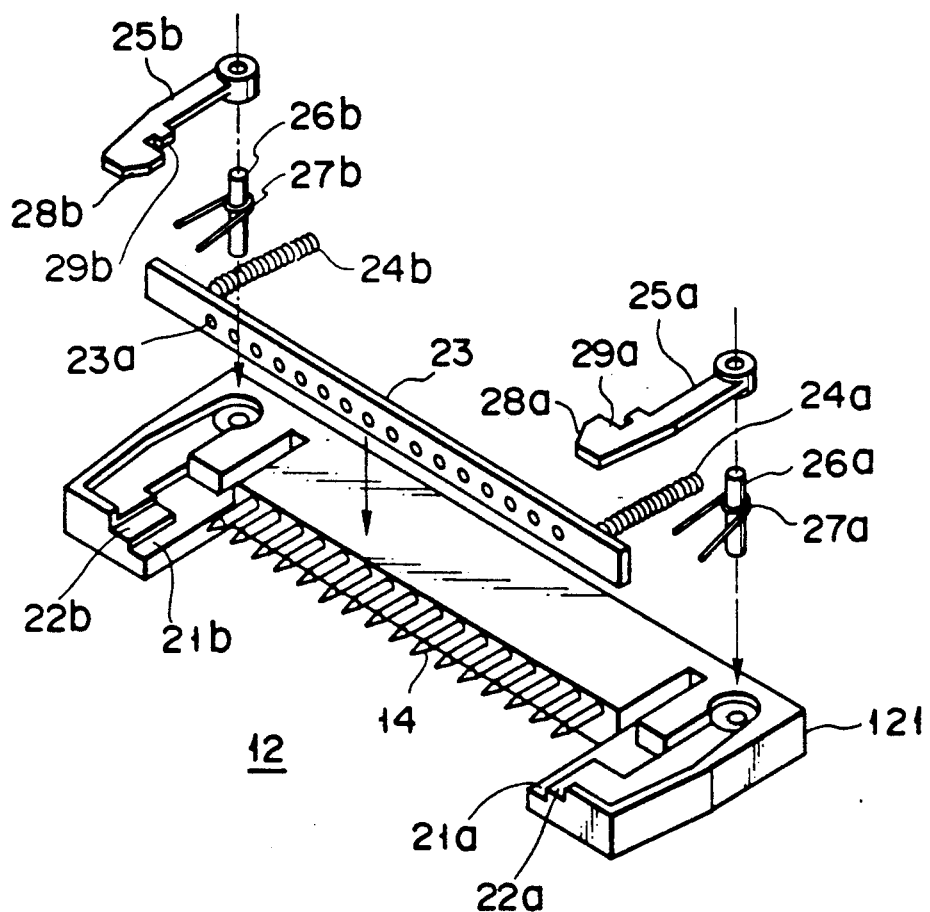
F I G. 4

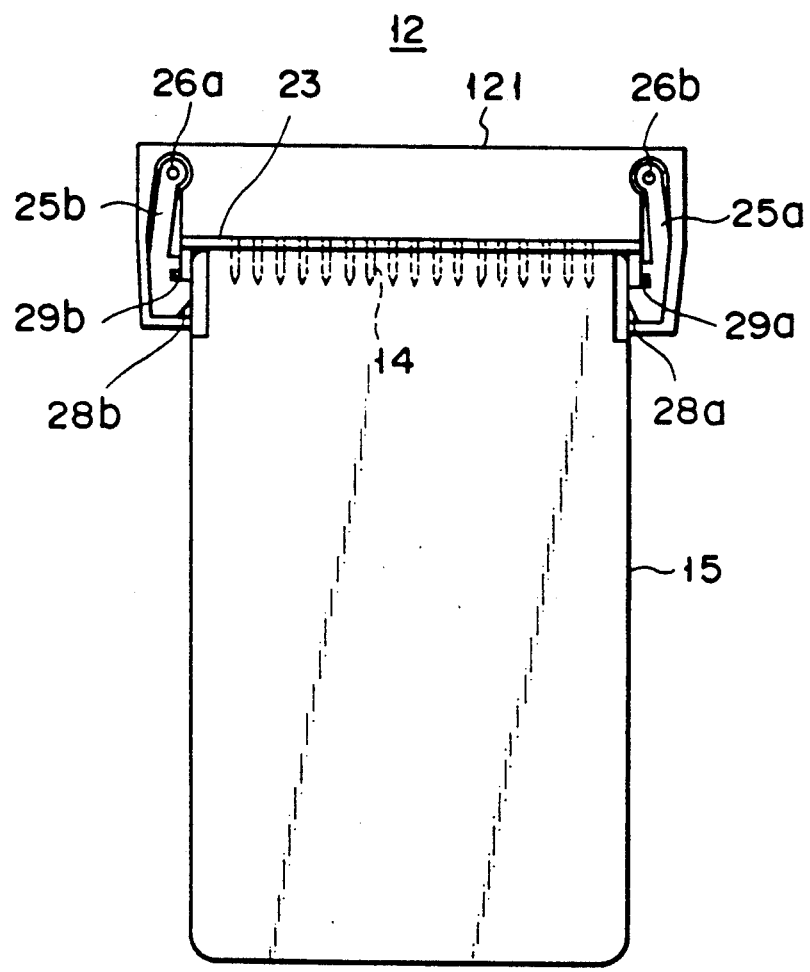
F I G. 8

DATA-PROCESSING APPARATUS IN WHICH A CARD-SHAPED RECORDING MEDIUM IS USED

BACKGROUND OF THE INVENTION

1. Field of the Invention

The present invention relates to a data-processing apparatus such as an electronic still camera, in which a card-shaped recording medium having, for example, a semiconductor memory is used to record image data.

2. Description of the Related Art

Silver-salt film is used as recording medium in most cameras widely used at present. After the image of an object has been transferred onto the silver-salt film, the film is chemically processed, thereby developing the image into a visible one. With the use of the silver-salt film, it is impossible to enjoy seeing the photo of the object, the moment the image of the object is transferred to the film.

Recently, electronic photographing systems have been developed and made commercially available, which convert an optical image of an object into electric signals, and reproduce the image from the electric signals by means of a TV receiver. Among these photographing systems is a still-picture recording system which comprises an electronic still camera, a TV receiver, and an image-reproducing device connected to the T receiver. A cartridge or a cassette of a recording medium, such as a magnetic tape, a magnetic disk, or a magnetic drum, is set into the electronic still camera. The image of an object is magnetically recorded on the medium. The cartridge or cassette is removed from the camera and set into the image-reproducing device. The image-reproducing device generates electric signals from the recorded medium and supplies these signals to the TV receiver. The TV receiver reproduces the image of the object from the electric signals.

Since a magnetic recording medium is used in the still-picture recording system, the electronic still camera must have a head for recording data on, and reproducing the data from, the recording medium, and also a drive unit for driving the recording medium. Consequently, the camera is massive and proportionally heavy. Further, the drive unit incorporated in the camera consumes much power to operate its mechanical components.

Very recently, a still-picture recording system of a new type has been developed which is smaller and lighter than the system described above. This new system is characterized by the use of a so-called "memory card" which is a card-shaped recording medium containing a volatile semiconductor memory such as SRAM. The electronic still camera of the new system converts the optical image of an object into electric signals. The electric signals, thus obtained, are recorded into the memory card, in the form of digital data. Due to the use of the memory card, neither the electronic still camera nor the image-reproducing device requires a drive unit. Hence, the camera and the image-reproducing device are smaller and lighter, and consume far less electric power than their counterparts of the still-picture recording system in which a magnetic recording medium is used.

The electronic still camera has a connector and a data-processing section. When the memory card is set into the camera, it is electrically connected to the data-processing section by the connector. Thereafter, the image data output by the data-processing section can written into the memory card, and the image data stored in the card can be read from the card. The camera can be used indoors or outdoor, under various conditions. It may be used in a dusty place. The connector must be structured such that dust is kept away from it. Otherwise, the dust damages the connection pins of the connector, inevitably jeopardizing the electrical connection between the memory card and the data-processing section.

A connector similar to that used in the camera is incorporated in the image-reproducing device, too. This connector connects to a memory card when the card is set in the image-processing device.

This connector can be of the same type which is used in a so-called "electronic notebook". The electronic notebook is a pocket-sized, data-processing apparatus which has a data-processing section and a connector, and in which a memory card is used. Memory cards storing various data items can be interchangeably set in the notebook, each for a specific purpose. When a memory card is set into the electronic notebook, it is electrically connected to the data-processing section by means of the connector. The electronic notebook is used indoors in most cases. Therefore, its connector has no protective means, but means for preventing a memory card from being inserted into the electronic notebook in the reverse direction. No measures are taken to protect the pins of the connector. In view of this, the connector cannot be utilized in the electronic still camera which is used very frequently in various conditions, both indoors and outdoors.

SUMMARY OF THE INVENTION

Accordingly, it is an object of this invention to provide a data-processing apparatus in which a card-shaped recording medium is used, and which comprises a connector of a simple structure having connection pins reliably protected and designed to be reliably connected to the recording medium.

To attain the object described above, according to the invention, there is provided a data-processing apparatus which comprises: a card-shaped recording medium containing a semiconductor memories and having a connector at one end; a housing; data-processing means located in the housing for receiving data from the semiconductor memories, processing the data, and supplying the processed data to the semiconductor memories; a connector unit incorporated in the housing means and having connection pins for connecting the connector of the recording medium to the data-processing means when the recording medium is connected to the data-processing means; pin-protecting member movable between a first position where the pin-protecting member opposes the pins and prevents anything other than the card-shaped recording medium from contacting the pins, and a second position where the pin-protecting member allows an electrical connection between the pins and the connector of the recording medium; and lock means for holding the pin-protecting member in the first position while the recording medium remains disconnected from the connector unit, and for allowing the pin-protecting member to move to the second position when the recording medium is set into the connector unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serves to explain the principles of the invention.

FIG. 4 is an exploded view of the connector unit;

FIGS. 7 and 8 are a perspective view and a plan view, respectively, illustrating the connector unit and the recording medium connected to the connector unit.

DETAILED DESCRIPTION OF THE PREFERRED EMBODIMENT

An embodiments of the invention will now be described in detail, with reference to the accompanying drawings.

Figure 1:
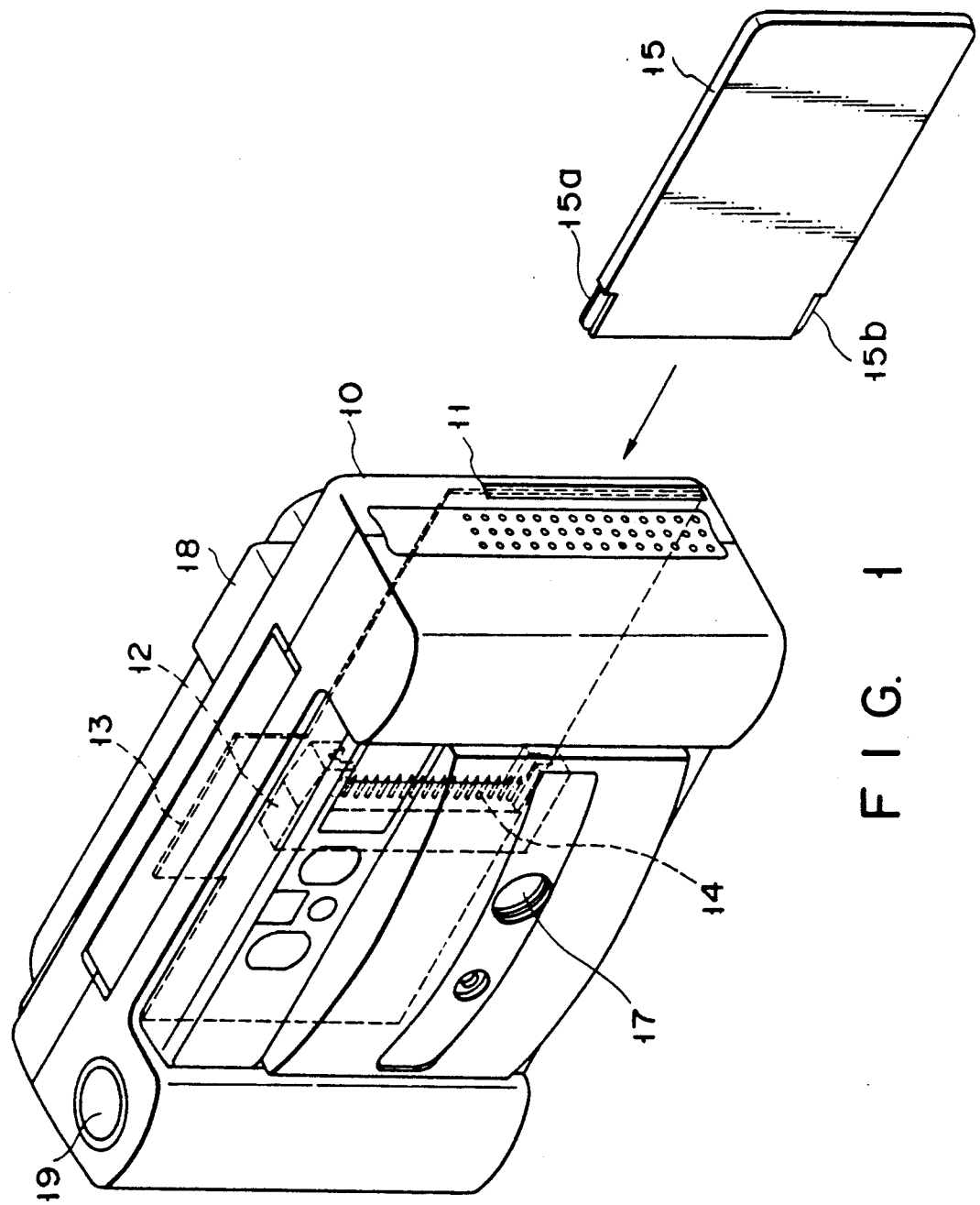
FIGS. 1 and 2 are perspective views showing an electronic still camera according to this invention.
Figure 2:
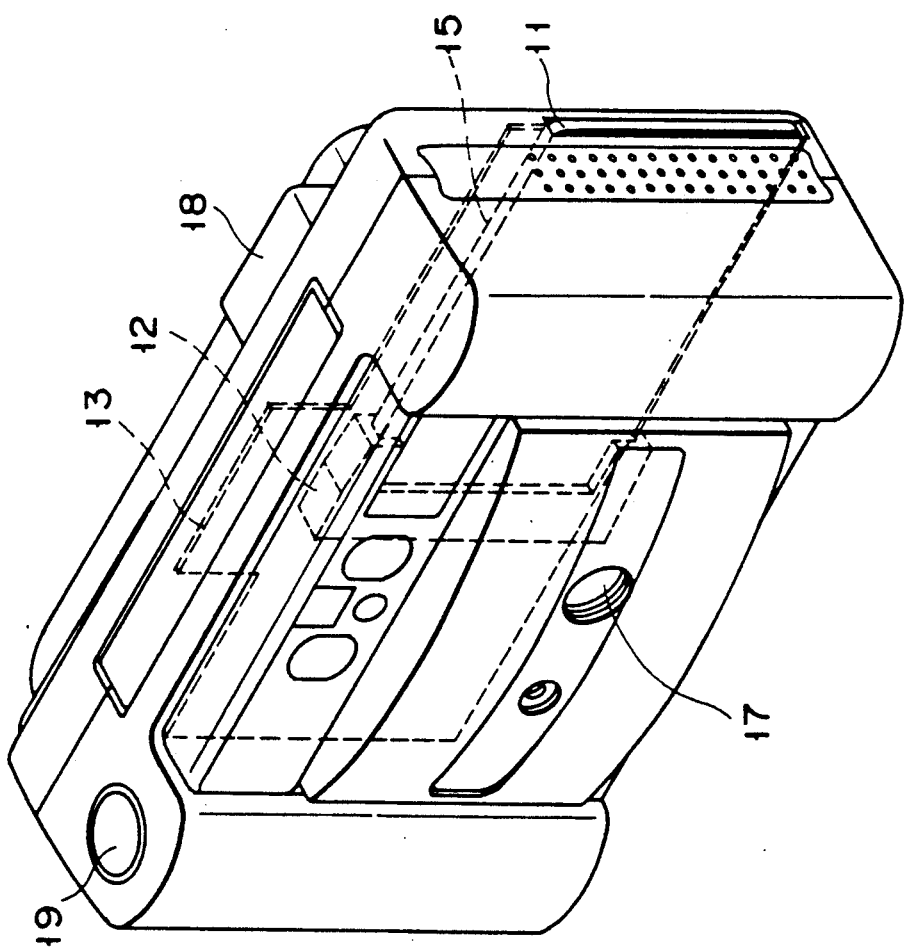
Figure 3:
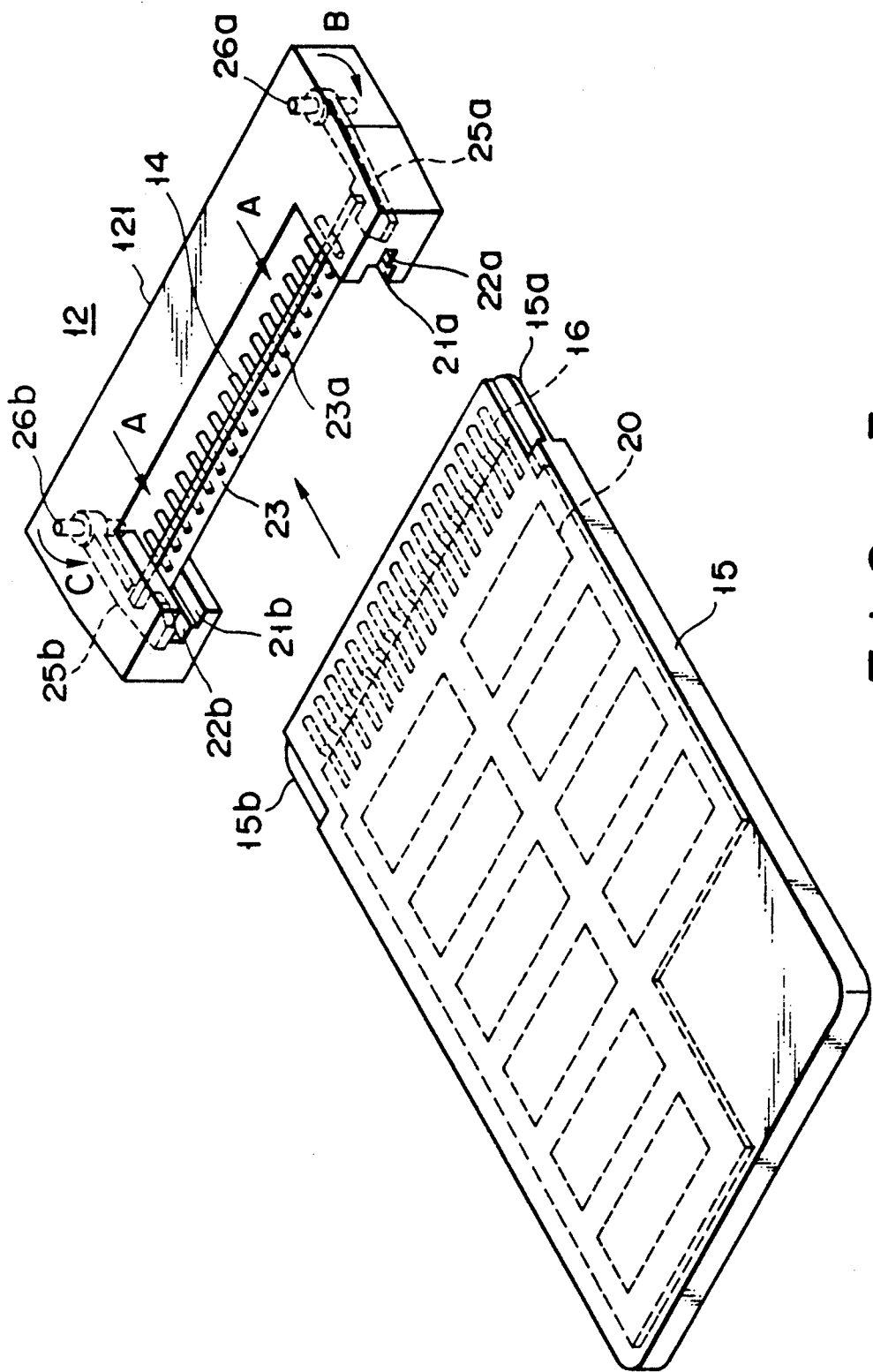
FIG. 3 is a perspective view illustrating the connector unit and the recording medium, both shown in FIGS. 1 and 2.

FIGS. 1 and 2 illustrate the electronic still camera according to the embodiment of the invention. As these figures show, the body 10 of the camera has a slot 11 into which a card-shaped recording medium 15 can be inserted. The camera body 10 contains a connector unit 12 and a printed circuit board 13. The board 13 contains a data-processing section. The connector unit 12 is located at the read of the slot 11 and mounted on the printed circuit board 13. The unit 12 has a plurality of connection pins 14. As is shown in FIG. 3, the card-shaped recording medium 15 has a pin receptacle 16 and contains semiconductor memory chips 20. The connection pins 14 of the unit 12 will be fitted into the pin receptacle 16 of the medium 15 when the medium 15 is inserted into the slot 11.

Like an optical camera in which silver-salt film is used as recording medium, the electronic still camera comprises an optical system 17, a finder 18 for defining a view angle, a release button 19, and the like—all incorporated with the body 10.

To use the electronic still camera, an operator inserts the card-shaped recording medium 15 into the slot 11, thereby electrically connecting the medium 15 to the data-processing section incorporated in the circuit board 13. Then, the operator adjusts the finder 18, thus setting the view angle at an appropriate value. He or she then positions the camera such that the optical system 17 is directed to an object. The operator pushes the release button 19, whereby the data-processing section generates digital data representing the image of the object. This data is stored into one of the memory chips 20. To reproduce the image thus recorded in the memory chip 20, the operator pulls the recording medium 15 out of the slot 11, and set the medium 15 into an image-reproducing device. The image-reproducing device converts the digital data stored in the medium 15 into TV signals. The TV signals are supplied to a TV receiver connected to the image-reproducing device. The TV receiver processes the TV signals, thus displaying the image of the object.

As is illustrated in FIG. 3, the connector unit 12 comprises a frame 121 having two end portions and a middle portion connecting the end portions. Guide grooves 21a and 21b are cut in the end portions of the frame 121. The unit 12 further comprises connection pins 14 and narrow grooves 22a and 22b. The connection pins 14 protrude from the middle portion of the frame 121, extends parallel to one another, and are set apart at regular intervals from one another. The narrow grooves 22a and 22b are cut in the bottoms of the guide grooves 21a and 21b, respectively.

As is also shown in FIG. 3, the pin receptacle 16 is provided in the front end of the card-shaped recording medium 15. The right and left corners 15a and 15b of the front end of the medium 15 are thinner than any other portion of the medium 15. The corners 15a and 15b are thin enough to be inserted into the narrow grooves 22a and 22b, respectively, when the medium 15 is inserted into the camera body 10 through the slot 11.

As can be understood from FIGS. 3 and 4, the connector unit 12 further comprises a pin-protecting member 23, coil springs 24a and 24b, lock members 25a and 25b, pins 26a and 26b, and torsion springs 27a and 27b. The member 23 is a strip having pin-guiding holes 23a. Its ends are loosely fitted in the guide grooves 21a and 21b of the frame 121. The coil springs 24a and 24b bias the pin-protecting member 23 outward, or in the direction of arrow A (FIG. 4). The first lock member 25a and the second lock member 25b are rotatably supported by the pins 26a and 26b, respectively. As is shown in FIG. 4, the torsion spring 27a biases the first lock member 25a clockwise, or in the direction of arrow B, whereas the torsion spring 27b biases the second lock member 25b counterclockwise, or in the direction of arrow C. The first lock member 25a has a tapered portion 28a and a holding portion 29a having a notch. Similarly, the second lock member 25b has a tapered portion 28b and a holding portion 29b having a notch. The front portions 28a and 28b have a tapered edge each, and the holding portion 29a and 29b have a notch each.

Figure 5:
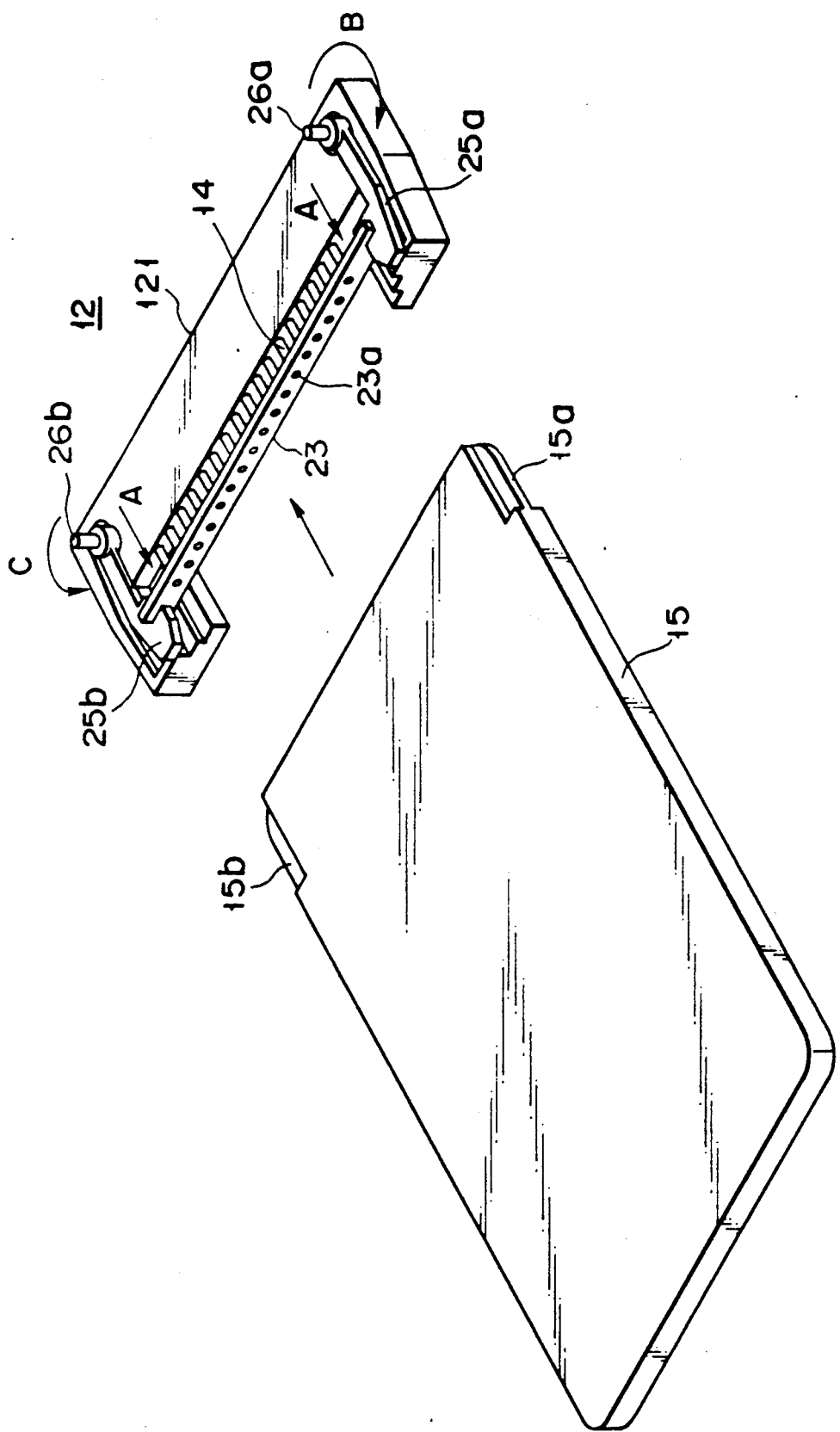
FIGS. 5 and 6 are a perspective view and a plan view, respectively, showing the connector unit and the recording medium disconnected from the connector unit.
Figure 6:
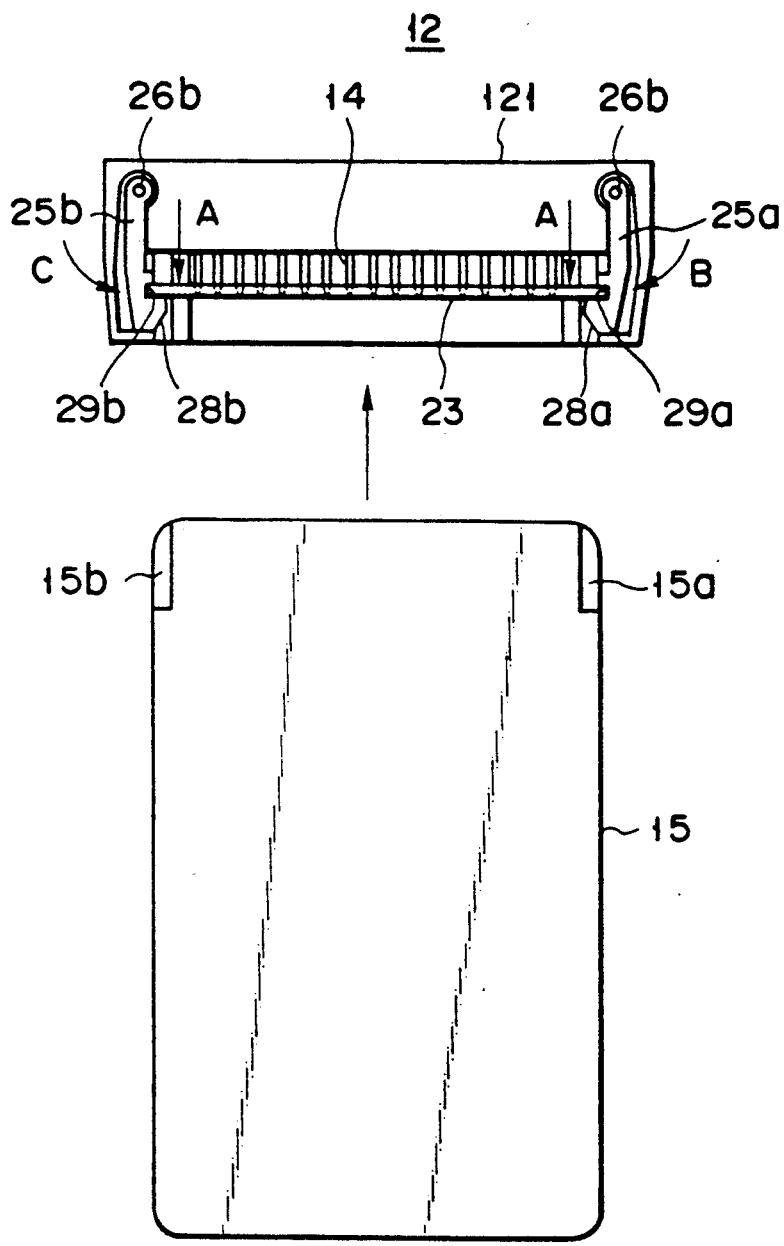

Until the card-shaped recording medium 15 is inserted into the slot 11, the lock members 25a and 25 hold the pin-protecting member 23 in the first position, or in front of the free ends of the connector pins 14, as is illustrated in FIGS. 5 and 6. This is because the portion springs 27a and 27b bias the members 25a and 25b in the directions of arrows B and C, respectively, and the ends of the member 23 is fitted in the notches of the holding portions 29a and 29b, respectively. As long as the member 23 remains in the first position, it prevents anything other than the medium 15 from abutting against the connector pins 14.

Figure 7:
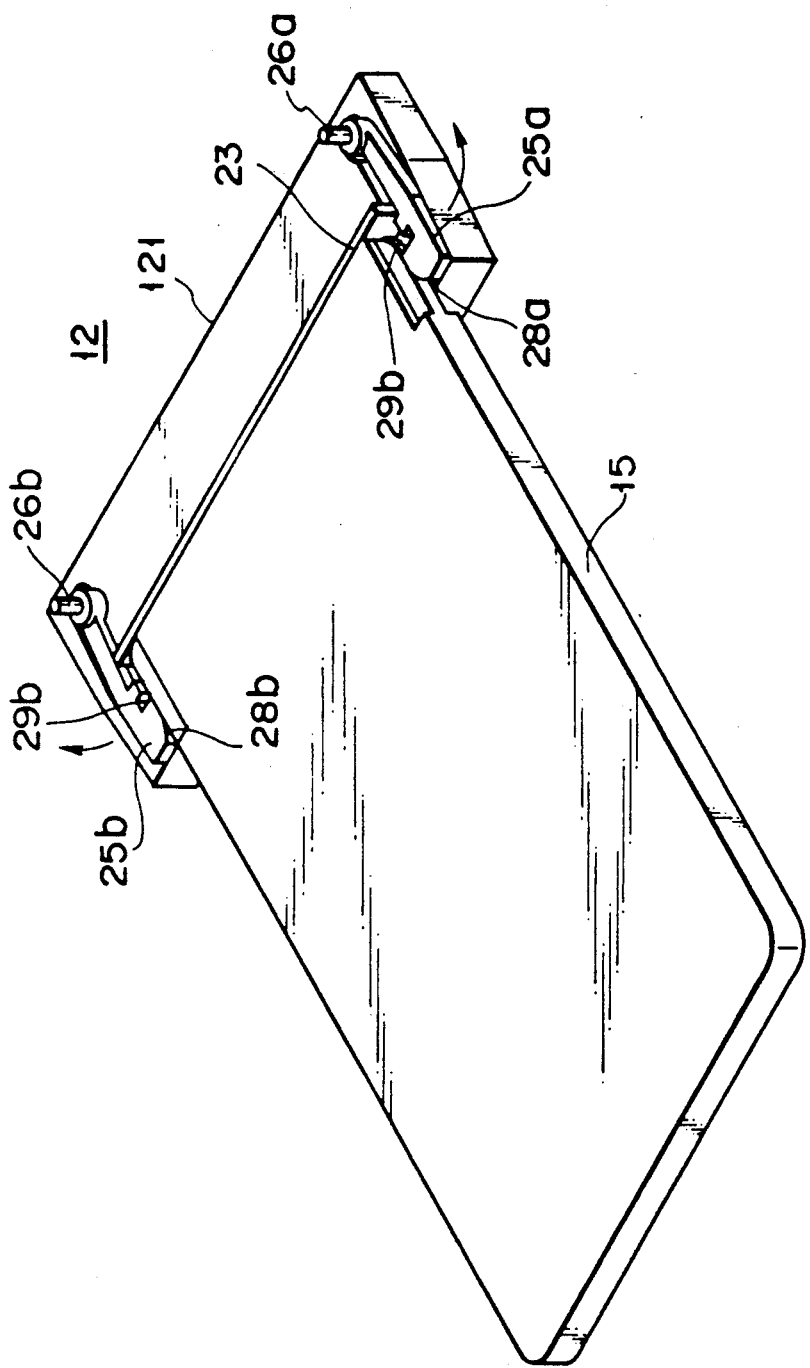

When the card-shaped recording medium 15 is inserted into the slot 11, its thin corners 15a and 15b abut on the tapered portion 28a of the first lock member 25a and the tapered portion 28b of the second lock member 25b, respectively, thus pushing the lock members 25a and 25b away from each other. The pin-protecting member 23 is thereby released from the holding portions 29a and 29b. As the medium 15 is further pushed into the slot 11, the member 23 is pushed onto the middle portion of the frame 121, or is moved to a second position, despite the biasing of the coil springs 24a and 24b. Hence, the connector pins 14 are guided through the pin-guiding holes 23a of the pin-protecting member 23, and eventually are inserted into the pin receptable 16 of the medium 15, as is illustrated in FIGS. 7 and 8. As a result of this, the connector unit 12 electrically connects the semiconductor memory chips 20 contained in the recording medium 15 to the printed circuit board 13 provided in the camera body 10. In this condition, the pin-protecting member 23 is interposed between the middle portion of the frame 121 and the front end of the recording medium 15.

When the card-shaped recording medium 15 is pulled from the slot 11, the pin-protecting member 23 is moved in the direction or arrow A, by virtue of the biasing of the coil springs 24a and 24b, until its ends slip into the notch of the holding portion 29a and that of the holding portion 29b, respectively. Thus, the pin-protecting member 23 is moved from the second position to the first position. In the first position, the member 23 prevents anything other than the medium 15 from abutting against the connection pins 14, and also prevents dust from sticking to the pins 14.

As has been described, unless the card-shaped recording medium 15 is inserted in the camera body 10, the pin-protecting member 23 remains in the first position, held by the lock members 25a and 25b, thereby protecting the pins 14 against damage. When the medium 15 is inserted into the camera body 10, its thin corners 15a and 15b push and rotate the lock members 25a and 25b away from each other, thus releasing the pin-protecting member 23 from the holding portions 29a and 29b of the members 25a and 25b. As the medium 15 is further inserted into the camera body 10, the member 23 moves to the second position. As a result, the connector pins 14 are inserted into the pin receptacle 16, whereby the semiconductor memory chips 20 contained in the recording medium 15 are electrically connected to the printed circuit board 13 provided in the camera body 10, as long as the medium remains in the second position. When the card-shaped recording medium 15 is pulled from the camera body 10, the pin-protecting member 23 moves in the direction of arrow A (FIG. 3) from the first position to the second position, by virtue of the biasing of the coil springs 24a and 24b.

Once back in the first position, the member 23 is held by the lock members 25a and 25b, in front of the connector pins 14. Therefor, the member 23 prevents anything other than the medium 15 from abutting against the connector pins 14, thereby protecting the pins 14 from damage. Also, the member 23 held in the first position protects the pins 14 from dust, thus helping accomplish a reliable electrical connections between the between the pins 14 and the pin receptacle 16 when the medium 15 is set in the second position.

In the embodiment described above, the lock members 25a and 25b are rotated away from each other when the thin corners 15a and 15b of the medium 15 abut on them. Nevertheless, the lock members 25a and 25b can be so rotated when the pin receptacle 16 of the medium abuts on them.

In the above embodiment, the pin-protecting member 23 can be moved between the first and second positions, i.e., in the axial direction of the pins 14, guided in the guide grooves 21a and 21b cut in the end portions of the frame 121. Instead, the member 23 can be rotated when the medium is inserted into the camera body 10, such that the member 23 moves from the first position to a second position above the array of pins 14. In the first position, the member 23 protects the pins 14 from damage and dust, and in the second position, it allows the electrical connection between the pins 14 and the pin receptacle 16 of the card-shaped recording medium 15.

Figure 9:
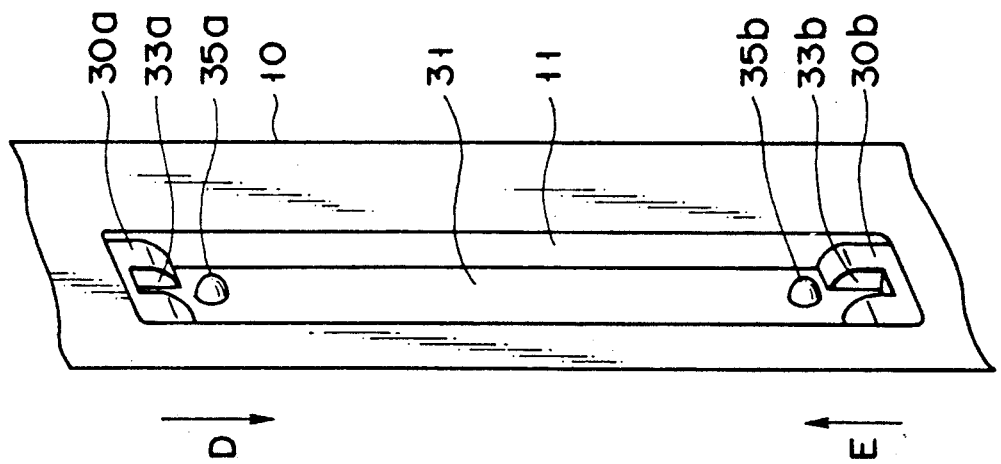
FIGS. 9, 10, 11 and 12, are a perspective view, and three sectional views respectively, all showing the pin-protecting member attached to the connector unit.
Figure 10:
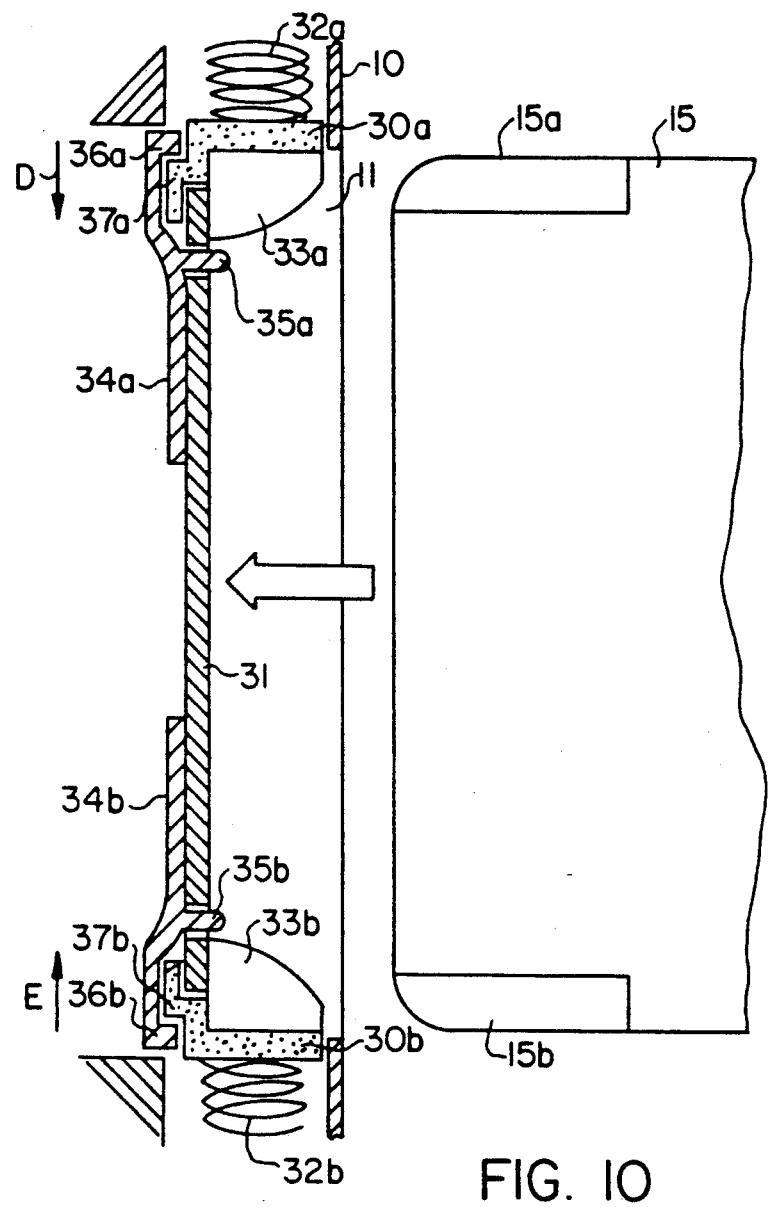
Figure 12:
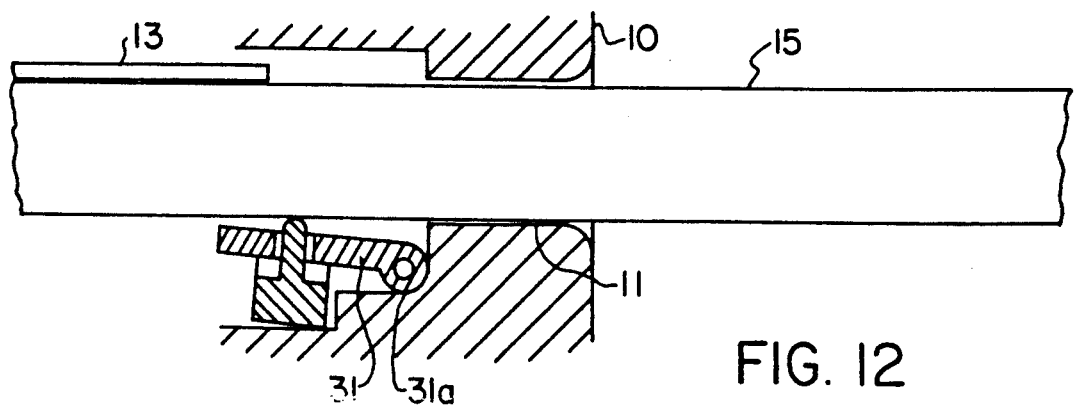
Figure 11:
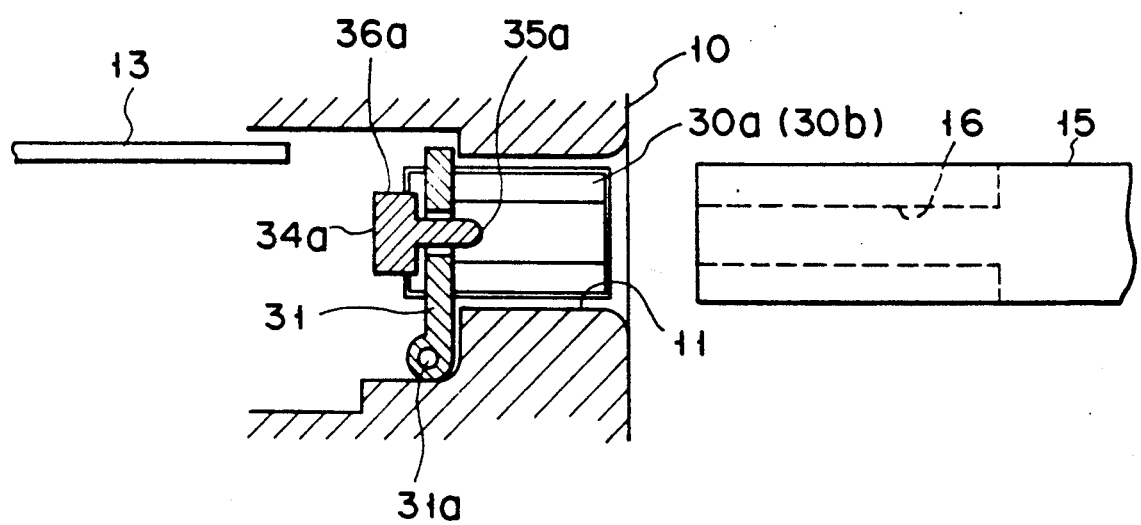

Moreover, the pin-protecting member 23 can be replaced by another type of pin-protecting member 31, as is illustrated in FIGS. 9 to 11. As is shown in FIGS. 11 and 12 the pin-protecting member 31 is hinged to a pin 31a at the slot 11 of the camera body 10, and can rotate around the pin 31a to open and close the slot 11. As FIG. 9 shows, lock members 30a and 30b, which are substantially identical to each other, are provided within the camera body 10 and at the upper and lower ends of the slot 11, respectively. As is illustrated in FIG. 10, two coil springs 32a and 32b (only the spring 32a shown) are located within the camera body 10, biasing the the lock members 30a and 30b in the directions of arrows D and E, respectively. The lock member 30a has two projections 33a and 37a spaced apart from each other. The lock member 30b also has two projections 33b and 37b spaced apart from each other. The projections 33a and 33b have a rounded surface. In the closed position, the pin-protecting member 31 has its ends held in the gap between the projections 33a and 37a of the lock member 30a and the gap between the projections 33b and 37b of the lock member 30b. Hence, the member 31 cannot rotate into the opened position, as long as it remains in the closed position.

As is evident from FIGS. 10 and 11, lock control members 34a and 34b are located behind, and fastened at one end to, the upper and lower end of the pin-protecting member 31, respectively. The lock control members 34a and 34b are elastic and have substantially the same structure. The member 34a has a projection 35a and a claw 36a. Though not shown, the member 34b also has a projection 35b and a claw 35b. The projections 35a and 35b extend forward through holes cut in the pin-protecting member 31. The claws 36a and 36b abut on the projections 37a and 37b, thus preventing the lock member 30a from moving in the direction opposite to arrow D, and the lock member 30b from moving in the direction opposite to arrow E.

When the card-shaped recording medium 15 is inserted into the slot 11, its front end pushes the projections 35a and 35b, whereby the lock control members 34a and 34b are bent such that their claws 36a and 36b release the projections 37a and 37b of the lock members 30a and 30b. As the medium 15 is further inserted into the slot 11, its thin corners 15a and 15b slide on the rounded surfaces of the projections 33a and 33b, pushing the lock members 30a and 30b away from each other, against the biases of the coil springs 32a and 32b. As a result of this, the pin-protecting member 31 is released from the lock members 30a and 30b. As the medium 15 is inserted still further, as illustrated in FIG. 12, its front end pushes the member 31 open, against the bias of a spring (not shown) which urges the member 31 to the closed position. Therefore, the card-shaped recording medium 15 can be inserted into the camera body 10 until the connector pins 14 are inserted into the pin receptor 16 provided in the card-shaped recording medium 15.

In the embodiment shown in FIGS. 9 to 11, the pin-protecting member 31 closes the slot 11 unless the card-shaped recording medium 15 is inserted in the camera body 10. In the closed position, the member 31 prevents dust and anything other than the medium 15 from entering the camera body 10 through the slot 11. Therefore, the member 31 protects not only the pins 14, but also the other components within the body 10, against damage.

The embodiments described above are electronic still cameras. Nevertheless, the present invention can be applied to any other data-processing apparatus, such as an image-reproducing device, in which a card-shaped recording medium is used.

The invention is not limited to the embodiments described above. Various changes and modifications can be made without departing from the scope of the invention.

Additional advantages and modifications will readily occur to those skilled in the art. Therefore, the invention in its broader aspects is not limited to the specific details, representative apparatus, and illustrated examples shown and described. Accordingly, various modifications may be made without departing from the spirit or scope of the general inventive concept as defined by the appended claims and their equivalents.

What is claimed is:

1. A data-processing apparatus comprising:
   a card-shaped recording medium containing at least one semi-conductor memory and having a connector at one end;
   a housing;
   data-processing means located in said housing, for processing data, said data-processing means adapted for at least one of receiving data from said semiconductor memory and supplying the processed data to said semiconductor memory;
   a connector unit incorporated in said housing and having connection pins for connecting said connector of said recording medium to said data-processing means when said recording medium is connected to said data-processing means;
   a pin-protecting member movable between a first position where said pin-protecting member opposes said pins and prevents anything other than said card-shaped recording medium from contacting said pins, and a second position where said pin-protecting member allows an electrical connection between said pins and said connector of said recording medium; and
   lock means for holding said pin-protecting member in the first position while sadi recording medium remains disconnected from said connector unit, and for allowing said pin-protecting member to move to the second position when said recording medium is connected to said connector unit.

2. The data-processing apparatus according to claim 1, wherein said pin-protecting member has a plurality of through holes coaxial with said pins, and is moved between the first and second positions in the same direction as said card-shaped recording medium is moved toward and away from said connector unit.

3. The data-processing apparatus according to claim 1, wherein said lock means releases said pin-protecting member from the first position when a predetermined portion of said card-shaped recording medium abuts on said lock means.

4. The data-processing apparatus according to claim 1, wherein said pin-protecting member is rotated around an array formed of said connection pins between said first and second positions.

5. The data-processing apparatus according to claim 4, wherein said housing has a slot, and said pin-protecting member is located at the slot.

6. A data-processing apparatus comprising:
   a card-shaped recording medium containing a semiconductor memory and having a connector at one end;
   a housing;
   data-processing means located in said housing, for processing data, said data-processing means adapted for at least one of receiving data from said semiconductor memory and supplying the processed data to said semiconductor memory;
   a connector unit located in said housing and having connection pins for connecting said connector of said recording medium to said data-processing means when said recording medium is connected to said data-processing means;
   a pin-protecting member rotatable between a first position and a second position as said recording medium is removed from and attached to said data-processing means, said pin-protecting member remaining at the first position as long as said medium is removed from said data-processing means, thus opposing said connection pins of said connector unit and preventing anything other than said recording medium from abutting on said connection pins, and at the second position when said medium is attached to said data-processing means, thereby to achieve an electrical connection between said connection pins and said connector of said recording medium.

7. An electronic still camera comprising:
   a card-shaped recording medium containing at least one semiconductor memory and having a connector at one end;
   a camera body containing data-processing means for processing data and supplying the processed data to said semiconductor memory;
   a connector unit located in said camera body and having connection pins for connected said connector of said recording medium to said data-processing means when said recording medium is connected to said data-processing means; and
   a pin-protecting member rotatable between a first position and a second position as said recording medium is removed from and attached to said data-processing means, said pin-protecting member remaining at the first position as long as said medium is removed from said data-processing means, thus opposing said connection pins of said connector unit and preventing anything other than said medium from abutting on said connection pins, and at the second position when said medium is attached to said data-processing means, thereby to achieve an electrical connection between said connection pins and said connector of said recording medium.

8. The electronic still camera apparatus according to claim 7, wherein said camera body has a slot, and said pin-protecting member is located at the slot.

9. An electronic still camera comprising:
   a card-shaped recording medium including at least one semiconductor memory and having a connector at one end;
   a camera body containing data-processing means for processing data, supplying the processed data to said semiconductor memory and having a slot;
   a connector unit located in said camera body and having connection pins for connecting said connector of said recording medium to said data-processing means when said recording medium is connected to said data-processing means; and a plate-shaped pin-protecting member located near the slot, having a continuous surface opposing said connection pins of said connector unit, being movable between a first position and a second position as said recording medium is removed from and attached to said data-processing means, and remaining at the first position as long as said medium is removed from said data-processing means, thus opposing said connection pins of said connector unit and preventing anything other than said medium from abutting on said connection pins, said plate-shaped pin-protecting member being adapted to move to the second position when said medium is attached to said data-processing means, thereby to achieve an electrical connection between said connection pins and said connector of said recording medium.

* * * * *